United States Patent
Begelfer et al.

(12)

(10) Patent No.: US 6,547,137 B1
(45) Date of Patent: Apr. 15, 2003

(54) SYSTEM FOR DISTRIBUTION AND CONTROL OF MERCHANDISE

(76) Inventors: Larry J. Begelfer, 343 Try Hill Dr., York, PA (US) 17403; Mark S. DeHoff, 4652 Tim Tam Cir., Indianapolis, IN (US) 46237; James M. Neff, 126 Rockford Ave., York, PA (US) 17402

( * ) Notice: Subject to any disclaimer, the term of this patent is extended or adjusted under 35 U.S.C. 154(b) by 231 days.

(21) Appl. No.: 09/723,947

(22) Filed: Nov. 28, 2000

Related U.S. Application Data
(60) Provisional application No. 60/185,773, filed on Feb. 29, 2000.

(51) Int. Cl.$^7$ .............................. G06F 17/60; G06K 5/00
(52) U.S. Cl. ......................................... 235/385; 235/380
(58) Field of Search ................................ 235/381, 375, 235/380, 382, 322.5, 462.01, 472.01, 385, 383; 283/86, 7

(56) References Cited

U.S. PATENT DOCUMENTS 3,637,989 A * 1/1972 Howard et al. ................ 101/93
3,704,949 A * 12/1972 Thomas et al. ............... 356/71

(List continued on next page.)

*Primary Examiner*—Thien Le
(74) *Attorney, Agent, or Firm*—McNees, Wallace & Nurick; Carmen Santa Maria

(57) ABSTRACT

An inventory and tracking system based on a labeling system is disclosed. Labels are provided for affixation to the product or product container. Each label includes, in addition to the standard information associated the product, a hologram associated with the product and a machine readable code. The machine readable code on each unit of product includes at least one set of unique machine readable identifiers that uniquely identifies each product unit. In addition, the hologram can include the trademark of the manufacturer or supplier, to permit the consumer to ascertain at a glance that the product originates from a source of known quality. The label on each unit is scanned before shipment and the destination of each unit of product is entered and stored. As the units of product are distributed through the distribution chain, the units are scanned, the destinations are stored and the information on the destination of the individual units of product are provided to the manufacturer, who maintains a master database that cross-references the machine readable identifier with the location of the product unit in the distribution chain. This master database also provides a historical record of the transit of each unit through the distribution chain. With this information in the master database, the manufacturer can determine the point at which the product entered the stream of commerce and whether or not the product entered the stream of commerce through an authorized source of distribution. Also, the manufacturer can quickly determine from the holographic label whether the product is authentic. The presence or absence of the unique machine readable identifier and hologram can confirm the product's authenticity or lack thereof.

15 Claims, 3 Drawing Sheets

U.S. PATENT DOCUMENTS

| | | | | |
|---|---|---|---|---|
| 3,770,941 A | * | 11/1973 | Gechele et al. | 235/383 |
| 3,894,756 A | * | 7/1975 | Ward | 283/109 |
| 4,041,279 A | * | 8/1977 | Foote | 235/440 |
| 4,269,473 A | * | 5/1981 | Flothmann et al. | 283/86 |
| 4,340,810 A | * | 7/1982 | Glass | 235/375 |
| 4,514,815 A | * | 4/1985 | Anderson | 235/385 |
| 4,558,318 A | * | 12/1985 | Katz et al. | 235/375 |
| 4,636,950 A | * | 1/1987 | Caswell et al. | 235/385 |
| 4,684,795 A | * | 8/1987 | Colgate, Jr. | 156/240 |
| 4,711,994 A | * | 12/1987 | Greenberg | 235/375 |
| 4,873,426 A | * | 10/1989 | Sarna et al. | 235/462.1 |
| 4,889,366 A | * | 12/1989 | Fabbiani | 283/77 |
| 4,945,215 A | * | 7/1990 | Fukushima et al. | 235/457 |
| 4,963,756 A | * | 10/1990 | Quan et al. | 235/462.27 |
| 4,988,154 A | * | 1/1991 | Hansen | 359/22 |
| 5,038,283 A | * | 8/1991 | Caveney | 235/384 |
| 5,059,776 A | * | 10/1991 | Antes | 235/454 |
| 5,074,595 A | * | 12/1991 | Hill et al. | 229/92.1 |
| 5,095,194 A | * | 3/1992 | Barbanell | 235/379 |
| 5,128,779 A | * | 7/1992 | Mallik | 283/86 |
| 5,145,212 A | * | 9/1992 | Mallik | 283/72 |
| 5,306,899 A | * | 4/1994 | Marom et al. | 235/382 |
| 5,336,871 A | * | 8/1994 | Colgate, Jr. | 235/380 |
| 5,367,148 A | * | 11/1994 | Storch et al. | 235/375 |
| 5,380,047 A | * | 1/1995 | Molee et al. | 283/74 |
| 5,401,944 A | * | 3/1995 | Bravman et al. | 235/375 |
| 5,422,744 A | * | 6/1995 | Katz et al. | 235/440 |
| 5,434,394 A | * | 7/1995 | Roach et al. | 235/375 |
| 5,478,990 A | * | 12/1995 | Montanari et al. | 235/375 |
| 5,757,521 A | * | 5/1998 | Walters et al. | 235/380 |
| 5,768,384 A | * | 6/1998 | Berson | 235/385 |
| 5,801,628 A | * | 9/1998 | Maloney | 235/375 |
| 5,817,796 A | * | 10/1998 | Stinchcomb et al. | 435/6 |
| 5,870,711 A | * | 2/1999 | Huffman | 235/376 |
| 5,963,134 A | * | 10/1999 | Bowers et al. | 235/375 |
| 6,105,004 A | * | 8/2000 | Halperin et al. | 235/383 |
| 6,328,209 B1 | * | 12/2001 | O'Boyle | 235/380 |
| 6,409,082 B1 | * | 6/2002 | Davis et al. | 235/375 |

\* cited by examiner

SYSTEM FOR DISTRIBUTION AND CONTROL OF MERCHANDISE

CROSS-REFERENCE TO RELATED APPLICATIONS

This application claims the benefit of U.S. Provisional Patent Application No. 60/185,773 filed on Feb. 29, 2000.

FIELD OF THE INVENTION

The present invention is directed to distribution and inventory control, and specifically to the authentication and control of goods from a manufacturer through the distribution chain to the consumer.

BACKGROUND OF THE INVENTION

Goods and merchandise are placed into the stream of commerce by manufacturers and suppliers as part of the business cycle. Because many goods and merchandise are similar, the manufacturers frequently apply trademarks in order to distinguish their goods from those manufactured by a competitor. These trademarks may be registered with the federal government's Trademark Office, with the various bureaus of each of the states or acquire common law meaning by use. The use of trademarks is a common way that a manufacturer of goods can identify his unique product to the buying public. The buying public has come to rely on the trademark as an indication of the source or origin of the goods. The consumer of the goods can rely on the trademark as an indication of the nature and quality of the goods, even if the source is unknown. Of course, the trademark also induces the supplier to maintain the consistent level of quality that the consumer has come to expect. In order to maintain the level of quality, the supplier may sometimes not permit a product to be distributed within a country, for example the U.S., because it may not meet the customer's expectations. In such a case, the product may carry the supplier's authentic trademark, but only is available for export. If such an exported product is then re-imported into the U.S., the product or goods are referred to as gray market goods. Because these goods may not be of the same quality as those designated for the U.S. market, their re-import is an act that the supplier or manufacturer usually desires to prevent.

Goods and merchandise placed into the stream of commerce by manufacturers frequently are tracked by a machine readable code. The machine readable code includes relevant information about the goods and merchandise, including identification or information about the manufacturer and an identification specific to the product. The machine readable code can be a series of bars and spaces, frequently referred to as a bar code. One well-known use of bar code is for a uniform product code, also referred to as a UPC. The UPC is widely used in commerce for many purposes. The consumer is most familiar with the UPC as the code that is scanned at check out at a retail outlet that provides the price of the item. Although this usually is the last use of the UPC, it has other purposes as the product is manufactured and distributed through the stream of commerce. For purposes of this invention, the machine readable code hereinafter will be used so as to include the term bar code. This terminology is not to be construed so narrowly as to be confined to restrictive symbology, such as the UPC. The machine readable code includes not only bar codes, but also technology that codes or decodes written symbols, electrical impulses, electromagnetic impulses, or electromechanical impulses to allow detection and identification.

Because of the value associated with trademarked goods, there is a growing problem with the counterfeiting of these goods. Typically, counterfeited goods look like the genuine goods of the manufacturer and may even carry the trademark of the manufacturer, but usually are knock-offs of inferior quality. These knock-offs represent a serious problem for the manufacturer, as his reputation can be tarnished by the counterfeit goods. However, these goods can be a threat to the health and safety of the consuming public, as the inferior counterfeit goods involves not only famous and expensive products such as ROLEX watches, but also articles such as aircraft engine replacement parts and circuit breakers for electrical panels. Clearly, the use of inferior products in these applications can lead to catastrophic results. Although these knock-offs sometimes are discovered and traced to their source by the legitimate trademark holder, in many instances they remain undetected unless and until there is a problem, or they damage the reputation of the manufacturer or supplier by disappointing the consumer. Thus, there is a need to improve the identification of goods to ascertain that the goods are authentic. Simultaneously, there is a need to control the inventory of goods within the distribution system so that authorized dealers and wholesalers of goods can be readily identified, and unauthorized dealers and wholesalers distributing authentic goods can quickly be identified and distinguished from those placing counterfeit goods into commerce.

Various methods have been used to improve security. An apparatus and a method for using the apparatus are set forth in related U.S. Pat. No. 5,306,899 to Marom et al. and U.S. Pat. No. 5,422,744. These patents utilize a machine readable code, such as a bar code, in conjunction with a holographic image that is recorded on an item to authenticate the item. The machine readable code may optionally be recorded as a holographic image. It should be noted that the use of a machine readable code that includes a unique identifier either as a holographic image or within a holographic image adds additional security by making it more difficult to copy the labels, but currently is expensive. However, advances in technology should lower the costs making this method price competitive. The apparatus and method are used to authenticate an item, such as at check out. While this apparatus and method for using the apparatus provides a method for a retailer to authenticate an item, for example a credit card, in order to assure the merchant that he is not defrauded, it is of little use to a consumer not in control of the equipment to assure that he is not being defrauded by the merchant. In addition, the apparatus and method set forth in these patents do not disclose means that manufacturers may use to detect counterfeit goods, gray market goods or goods distributed outside of authorized channels.

What is needed is a system for use by a manufacturer for reliably detecting gray market goods and goods distributed outside authorized distribution channels. Ideally, the method should also provide the consumer with a means for identifying goods with some degree of confidence so that the consumer can ascertain that the goods purchased originate from a source of known quality. The system should deter counterfeiting by making it difficult for the counterfeiter to copy the means for identifying the goods. If the unauthorized marketer successfully places goods into the stream of commerce, the system should readily provide a convenient tracing system for the manufacturer to determine the point at which the unauthorized goods enter the stream of commerce.

SUMMARY OF THE INVENTION

The present invention is an inventory and tracking system based on a labeling system. Labels are provided for affixation to the product or product container. Each label includes, in addition to the standard information associated the product such as the product name, required warnings and such additional information that a manufacturer wishes to include thereon, a hologram associated with the product and a machine readable code. The machine readable code may be a bar code that can include the UPC code for the product, and a supplemental code that provides a unique identification for the product unit. Although a hologram does not eliminate the threat of counterfeiting, the product and its label, it discourages counterfeiting since the equipment required to counterfeit a hologram requires a large capital investment. Moreover, when the hologram includes the trademark of the manufacturer or supplier, the consumer can ascertain at a glance that the product originates from a source of known quality and that the absence of a trademark hologram is an indication that the goods may not originate from the trusted source.

The machine readable code on each unit of product includes at least one set of unique machine readable identifiers. When the UPC is utilized for identification, an additional bar code is included that uniquely identifies each product unit. This additional bar code identifier serves the same purpose as a serial number. The label on each unit is scanned before shipment and the destination of each unit of product is entered and stored. As the units of product are distributed through the distribution chain, the units are scanned, the destinations are stored and the information on the destination of the individual units of product are provided to the manufacturer, who maintains a master database that, as minimum, cross-references the machine readable identifier with the location of the product unit in the distribution chain. This master database also provides a historical record of the transit of each unit through the distribution chain. With this information, the manufacturer can work either upstream or downstream. If working downstream, that is, by looking at the locations to which product is being distributed, the manufacturer can ascertain important marketing information with regard to the sales of the product. If working upstream, that is, by obtaining a unit of product, the manufacturer can determine whether the product is an authentic product and whether the product entered the stream of commerce through an authorized source of distribution. Also the manufacturer can quickly determine from the holographic label whether the product is authentic. The presence or absence of the unique machine readable identifier can confirm the product's authenticity or lack thereof and should be of assistance in determining the point at which the product entered the stream of commerce. An optional alphanumeric code on the label can be used by consumers or those in the distribution chain to verify authenticity, if desired.

An advantage of the present invention is that the identification and tracking system utilized by the manufacturer can provide the product consumer with additional confidence that the products or goods purchased by the consumer are authentic.

Another advantage of the present invention is that the manufacturer can track goods that enter the stream of commerce from unauthorized sources and can more easily determine which goods are counterfeit and origin of the goods into the stream of commerce. Furthermore, the high capital investment in equipment and technology required to produce counterfeit labels for counterfeit goods will discourage potential counterfeiters, reducing the likelihood that counterfeiting will occur. When the goods are counterfeit, the manufacturer is provided with additional remedies as set forth by trademark law.

Another advantage of the present invention is that the product manufacturer can readily obtain marketing information concerning consumption patterns, demographic information, statistical patterns related to the income of consumers and other related information based on point-of-sale without having to rely on post-sales mail-in information.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE PRESENT INVENTION

Figure 1:
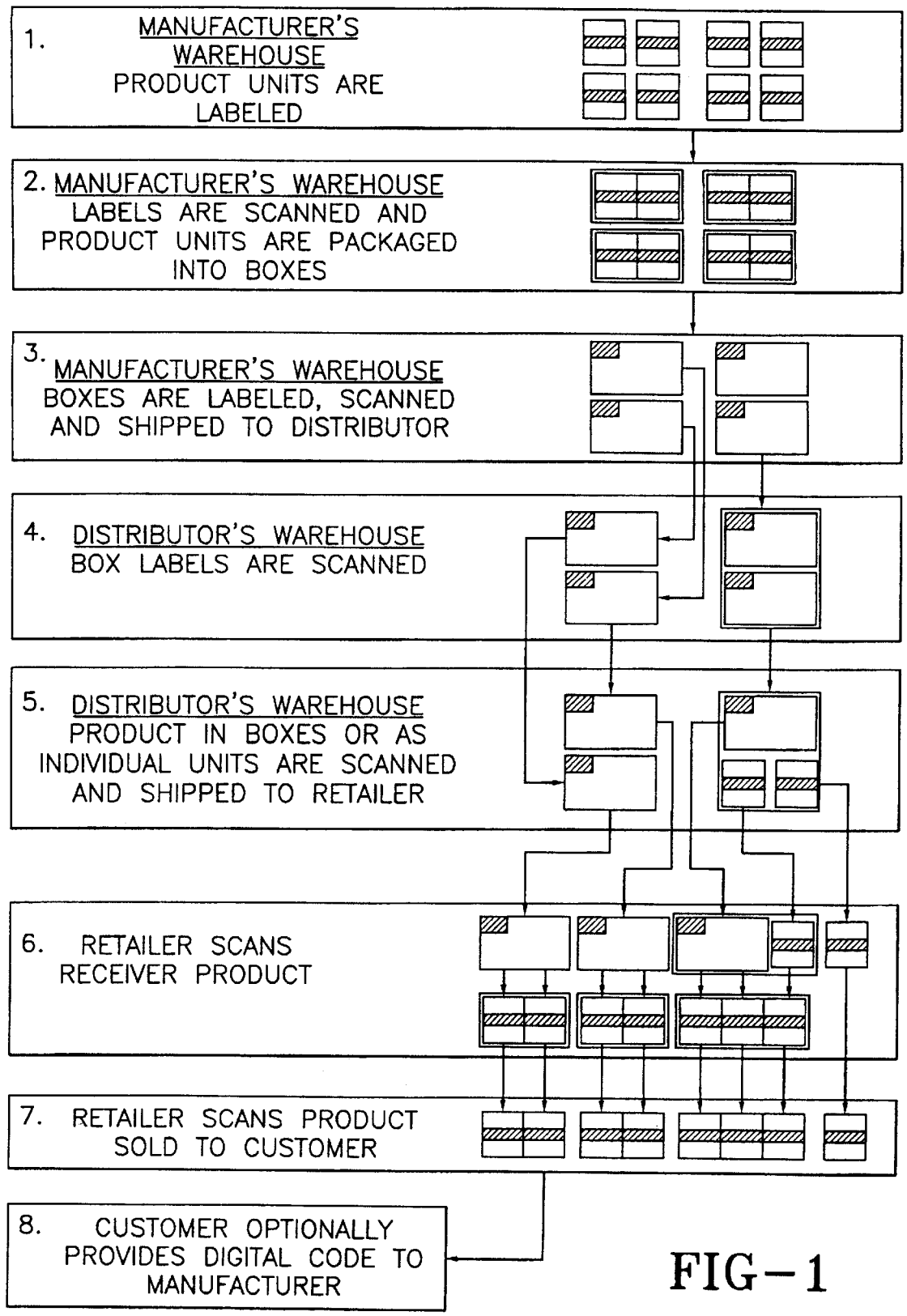
FIG. 1 is a flow chart of product units from the manufacturer to the consumer of the product units.
Figure 2A:
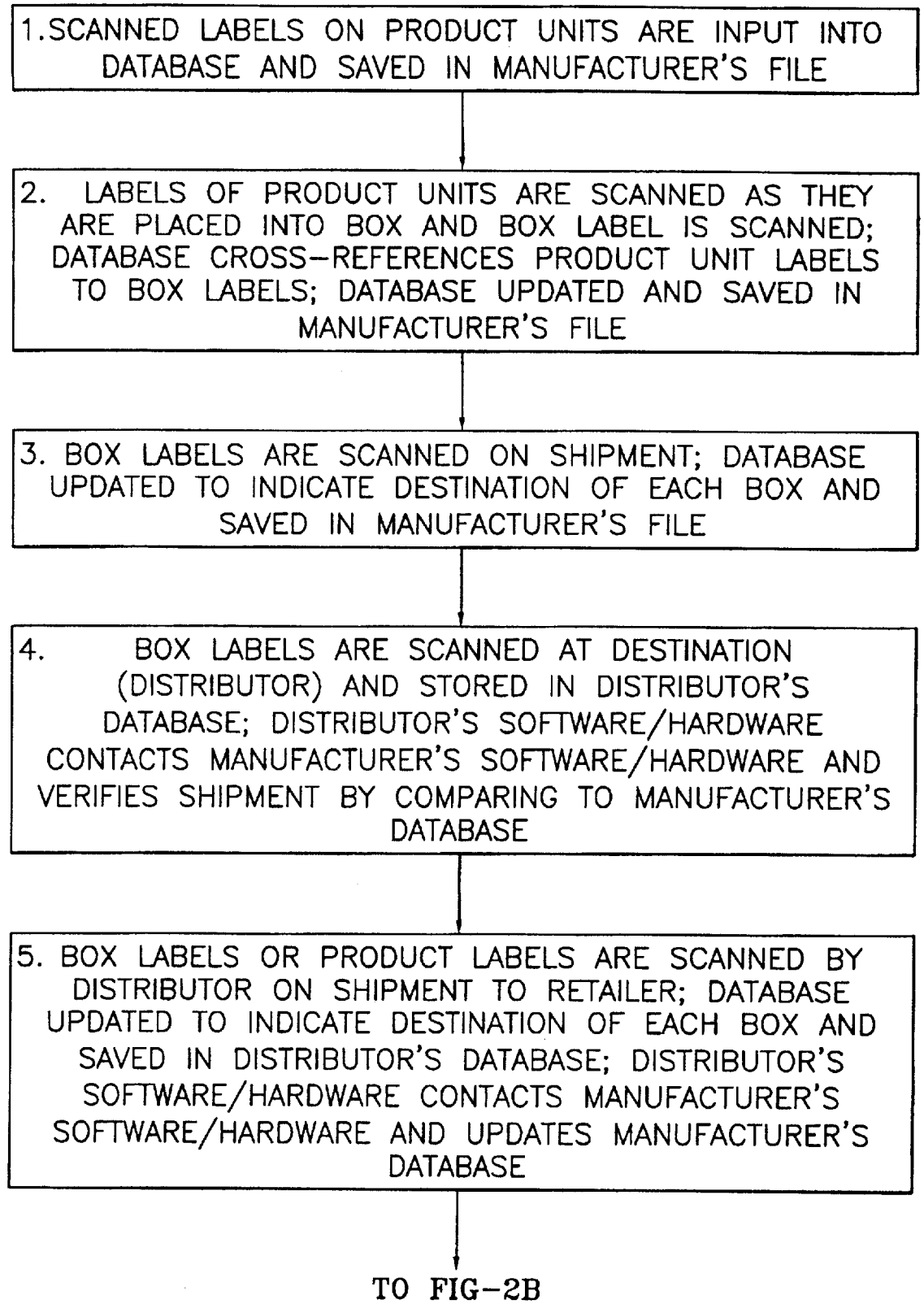
FIG. 2 is a flow chart of the system used to track the identification of the product units from the manufacturer to the consumer.
Figure 2B:
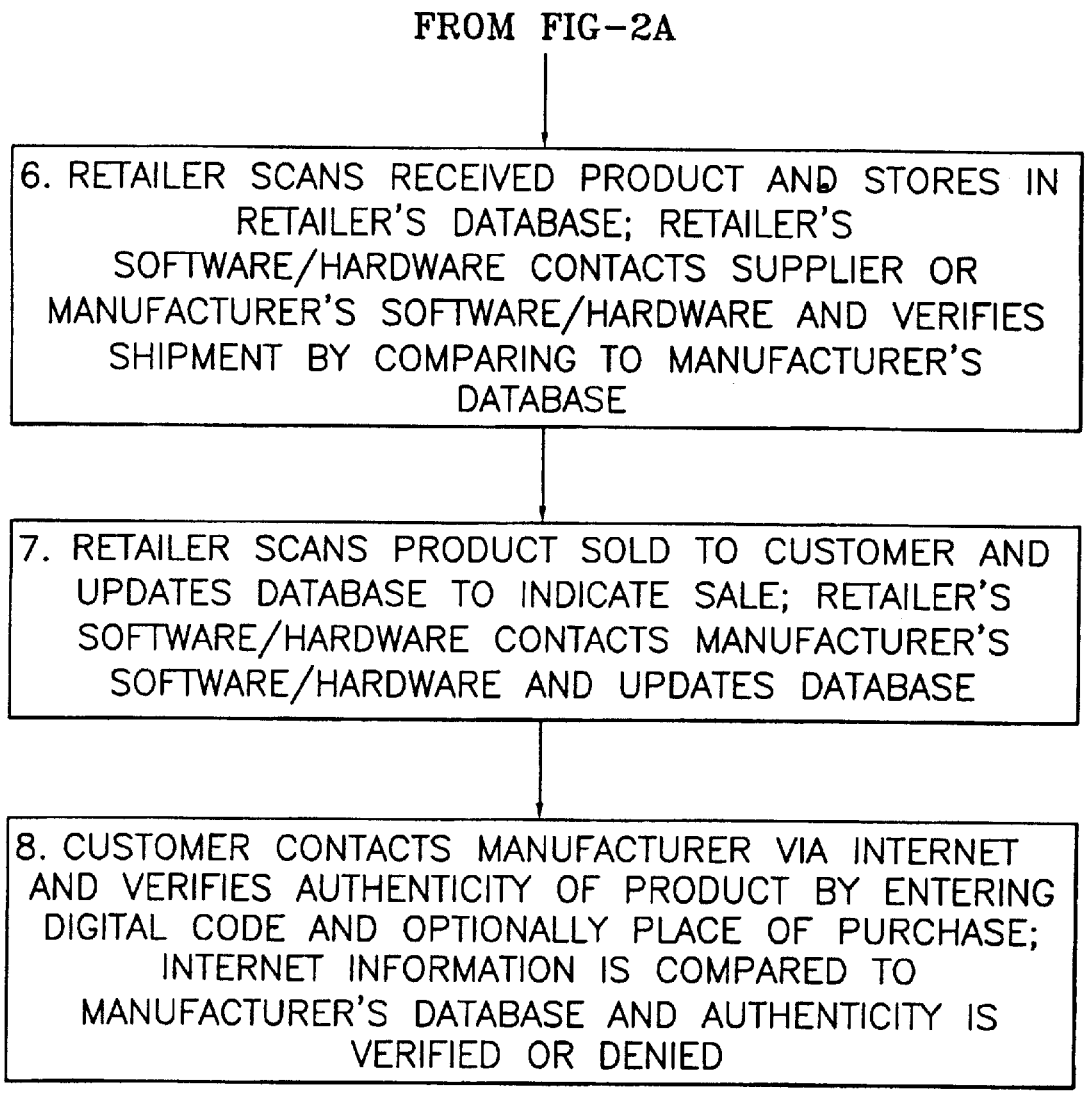

FIG. 1 and FIG. 2 are flow charts of product units from the manufacturer of the product to the consumer or the product, and the system used to track the identification of the product units from the manufacturer to the consumer. Proper functioning of the tracking system is based on properly affixing product labels to the product, both as individual product units and as larger aggregations for shipment and use of manufacturer-supplied or authorized software and related equipment provided to each of the members within the distribution chain. The system set forth in FIG. 2 is integrated from top to bottom so that the manufacturer's hardware and software and the hardware and software utilized by each of the vendors in the distribution system can easily communicate with each other. While the various participants in the distribution system can attempt to integrate their existing software to exchange the information, it is envisioned that the product manufacturer supplies the software, and hardware to the extent required, to each of the vendors in the distribution system for installation into their computer systems for seamless tracking of the product. While generally it is envisioned, as will be explained in detail, that the manufacturer's database be updated by a telephone modem link between the vendors' computers and the manufacturer's computers, the method of updating is not meant to be so limited. For example, it is possible to update the manufacturer's database by exchanging the information using a suitable Internet connection with proper security, which can be embedded in the manufacturer-provided software so as to minimize the potential for unauthorized entry into the system. Alternatively, if rapid exchange of information is required, it is possible for some or all of the vendors computers in the distribution system to be connected to the manufacturer's computer using wireless communication that can transfer the required information essentially instantly via satellite. Neither the method of transferring the information or the software employed to maintain and update the database is novel, and any suitable software may be used. However, the integration of the hardware through the distribution chain in order to track product produced or shipped by the manufacturer as well as the use of special labels to discourage counterfeiting is unique in the industry. Preferably, in order to insure compatibility, all software and hardware in the distribution chain are integrated together and obtained from a single source. The hardware can include machine readable instrumentation such as scanners, printer applicators, presence/absence sensors for holograms, computers with communications capabilities such as modems and other I/O (input/output) components. This equipment should work seamlessly with the software.

In FIG. 1, product units are labeled using substantially standard product labels. However, these labels include a plurality of additional markings, that may or may not be immediately evident, to ensure the authenticity of the product and to allow the product to be quickly and efficiently tracked. One of these markings which is evident is a holographic image. Holographic images or holograms are well known in the art and are recording of interference patterns between two beams of light, a signal beam and a reference beam, of an image. The signal beam usually includes the image to be recorded while the reference beam is a beam of light of constant distribution. Typically, a second reference beam which is similar, but not necessarily identical to the one used to record the hologram is used to reconstruct the signal beam which then produces an identifiable image. It is preferred that the image be of a trademark of the manufacturer of the product, as this serves as a well-known identification to the consumer of the quality of the product being sold. While the holograms may be counterfeited by unscrupulous individuals, the large investment in equipment required to produce counterfeit holograms will dissuade would-be counterfeiters. Furthermore, holograms also can have covert security features as well as the previously set forth overt security features. The covert security features can be included within the hologram in several ways. One security feature is to embed an image or identification in the hologram that is only visible with an appropriate light source or reference beam of predetermined wavelength. Alternatively, the embedded image or identification can only be detected at magnification. These covert features are usually static because of cost. However, for certain high priced products, these features can include unique identifiers. Even though the consuming public will not be aware of any covert features, it will come to recognize the trademark hologram as a further indication of genuine goods, and the absence of the trademark hologram should raise the consumer's suspicion.

The label also includes a machine readable code, which is evident. This code can be assigned to the product unit or its container in the usual manner to identify the product, such as a UPC, but also must include a sequentially-applied code that uniquely identifies each product unit by the applied label, which is not evident. The label also may include a unique alphanumeric marking corresponding to the sequentially-applied bar code, that visually identifies each label. The bar code, including the sequentially-applied unique code, is machine readable and designed to be used so that vendors can mechanically input information from a reader, such as a scanner, to the software provided for use by the manufacturer, thereby reducing the possibility of errors. Equipment capabilities can optionally be included to read the hologram, if desired. The same equipment or additional equipment can be utilized to scan the hologram for authenticity if additional security is required. As an ultimate safeguard, a method for identifying each holographic image can be used, such as for example by providing unique identifiable machine readable indicia be encoded into the hologram. Thus, not only is each machine readable code unique, such as the bar code, but also each hologram is unique, even though visually the holograms appear to be identical.

After the labels are affixed to the product, the machine readable codes on the labels are scanned utilizing the appropriate equipment. While the scanning equipment may include a memory that can be downloaded into a computer that includes the master database used for tracking, the equipment may send a signal indicative of the unique bar code for recordation into the database. The units may be placed in storage or assembled together into larger aggregations or units for shipment. The units may be boxed into boxes or containers that hold a plurality of units or they may be palletized. Of course, each product unit that is boxed or palletized has its machine readable code scanned so that the units in the box or pallet can be identified. Each box or pallet then has a separate label applied to it. As a minimum, this label includes a unique machine readable code, but preferably also includes a hologram indicative of the source of the goods, as previously discussed. This machine readable code is scanned, and the master database is updated to cross-reference the machine readable codes of the product units previously stored in the database to the larger aggregation, such as a box or pallet, into which it has been assembled. As one will recognize, this method of identification can be used as boxes are assembled onto pallets, and pallets into containers, containers into trucks, trucks onto railcars and so forth. As the shipping destination for the larger aggregations or units is identified, the master database is updated to indicate this destination. Optionally, the database may include a field to indicate that the aggregations or larger units are in transit and identify the carrier, so that the location of each individual unit can be ascertained at any time.

Upon receipt of the aggregations or larger units at a distributor, the distributor scans the machine readable codes of the labels affixed to the received aggregations. This information is then transferred to the software in the distributor's computer, that creates or adds to the master data base for the product. A visual inspection for the presence and adequacy of the hologram can provide an initial indication that the shipment is in proper order. If the hologram is missing or does not appear to be authentic, the distributor is alerted that there is a problem with the shipment and can immediately communicate with manufacturer regarding this anomaly. Within a predetermined period of time, the distributor's computer is placed into communication with the manufacturer's computer so that the manufacturer's database can be updated. The software used by the distributor identifies the distributor to the manufacturer's computer that retains the master database. The manufacturer's database compares the items shipped from its facility with the items identified as received by the distributor, to verify that not only the proper number of items were received, but also that the machine readable codes on the aggregations or larger units received match the codes on the aggregations shipped. If the codes do not correspond, the manufacturer and distributor are alerted to an anomaly. If the codes match, the master database is updated to indicate the location of the product identified as received by the distributor. The manufacturer optionally may download to the distributor's computer the coding or identification of all of the individual product units contained in the aggregations or larger units shipped to the distributor. When the distributor ships product to the next recipient in the distribution chain, the distributor scans the machine readable code on each of the aggregations. If the aggregations are broken into smaller units, the machine readable codes on the smaller units are scanned. The scanned information is transferred to the software database maintained by the distributor and the destination of the product is recorded. Again, within a predetermined time, the distributor's computer is placed into communication with the manufacturer's computer, so that the manufacturer's master database can be updated. As before, the shipment may be verified upon receipt by scanning the machine readable codes.

This process may be included for each distributor or warehouse in the distribution chain. The receiver of the goods can inspect for the presence of the appropriate shipping label and hologram and then scan the machine readable codes on the label for recordation in a device using software provided by the manufacturer. Within a predetermined time, the device will communicate with the manufacturer's computer or with the computer of the upstream distributor in the distribution chain, or both, in order to verify receipt of the proper product. The receiver's computer software includes a code to identify the receiver of the goods so that the master database can be updated to indicate the proper location of the product. Ultimately, the manufacturer's master database is updated to identify the location of each of the individual product units. When product is shipped from a distributor to a downstream user in the distribution chain, the machine readable codes of the aggregate units shipped, or the machine readable codes of smaller units, when the aggregate unit is broken into smaller units, are read and recorded along with the shipping destination. This information is transferred up the distribution chain or directly to the manufacturer using the methods previously discussed so that the master database maintained by the manufacturer can be updated. If the correct hologram is not present or if machine readable codes are communicated that do not match up with the master data base, then the manufacturer can alert the distributor or warehouser that the product is suspect, and the product can be investigated as either gray market or counterfeit.

When the product units are received by the retailer and the receipt of the items is verified and transferred back to the manufacturer to accomplish the updating of the master data base in the manner previously described, the retailer places the items on sale. This may be to a consumer or to a business for their use. For sales to a consumer, the retailer will scan the product unit using standard equipment and store the machine readable code of the sold product unit on software provided by the manufacturer. The retailer may optionally obtain information about the consumer, for example, their zip code or phone number. Alternatively, the retailer may have a customer profile, as occurs when a customer applies for an identification card. This information may also be stored with the product code of the sold product unit. Within a predetermined time, the information stored on the software provided by the manufacturer to the retailer ultimately can be transferred back to the manufacturer, along with the optional information concerning the consumer, such as the zip code, phone number or profile. The master database is updated to indicate that the product was sold through the retailer.

When purchasing the product, the presence of the hologram, preferably of the manufacturer's trademark, will provide the consumer with some assurance of the authenticity of the product. The consumer who purchases the product optionally may contact the manufacturer. This can be accomplished on an optional web site maintained by the manufacturer. For example, if the consumer suspects that their is a problem with the hologram, i.e., if the consumer suspects it is a counterfeit or a gray market good, the consumer can enter the alphanumeric designation on the product label, preferably the name of the retailer, and his/her e-mail address and receive confirmation or denial regarding the authenticity of the product. The web site will transfer the information to the manufacturer who will then compare the information provided by the consumer with the master database. If the information provided by the consumer matches information in the master database, the consumer will be informed that the product in the consumer's possession is authentic. If the information provided by the consumer does not match the information in the master database, the consumer may be so informed. This process can be automatic. For example, the information from the web site can be transferred via software so that the comparison can be made. An informational e-mail automatically can be returned to the consumer informing the consumer that the goods are authentic. If the goods are not authentic, the return e-mail may provide the consumer with additional instructions. Alternatively, the software may flag any communications that verify inauthentic goods so that a product representative can contact the consumer for follow-up information and with additional instructions.

This system also can be used to the benefit of the manufacturer. When the manufacturer receives information from a consumer regarding suspected counterfeits or gray market goods, if the product unit identified by the consumer is not verified as authentic or as originating from the gray market, the manufacturer is provided with the name of a suspect retailer who may be selling counterfeit goods.

The manufacturer can also utilize the system for inventory control to identify distributors and retailers who require replacement inventory. By using the information regarding shipping and sales, the manufacturer can determine as well as predict who requires restocking before a request is needed from the distribution chain. This allows the manufacturer to more efficiently allocate production resources. The manufacturer can also determine historical trends and immediately respond to changes in these patterns.

The manufacturer can also utilize the information provided for marketing. Clearly, when the retailer provides customer-related profiles, the manufacturer can determine the specific types of consumers attracted to the manufacturer's goods. However, when the retailer supplies information related to zip codes and phone numbers, the manufacturer, with proper analysis, can glean general geographic demographic, income and political information about likely consumers. Even when the retailer does not supply any information about the consumer, the manufacturer can hypothesize about the likely consumers based on the location of the retailer and the quantity of sales.

Finally, for manufacturers who desire only to have the product line distributed through authorized and approved dealers, the manufacturer will be able to use the inventory system of the present invention to identify the source of product diversions within the distribution system, so that corrective action can be implemented as required.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A system for tracking items of merchandise through a plurality of locations in a stream of commerce comprising
  a database, said database storing identification information on each of said items of merchandise and location information on each of said items of merchandise;
  a label attached to each of said items of merchandise, said label including a hologram and a machine readable code having said identification information on said item of merchandise from said database;

means for scanning at each location in said stream of commerce said machine readable code on said label attached to said item of merchandise to obtain said identification information on said item of merchandise;

means for transmitting from each location in said stream of commerce to said database said scanned identification information and location information on said location in said stream of commerce;

means for updating said database to include said transmitted location information on said location in said stream of commerce for said scanned identification information; and means for tracking said item of merchandise having identification information using said transmitted location information in said database.

2. The system for tracking items of merchandise of claim 1 further comprising means for a purchaser of an item of merchandise having a label with identification information and a hologram from a location in said stream of commerce to authenticate said purchased item of merchandise, said purchased item of merchandise being authentic when said identification information on said label of said purchased item of merchandise corresponds to an entry of said stored identification information in said database.

3. The system for tracking items of merchandise of claim 2 wherein said means for a purchaser to authenticate said purchased item of merchandise further comprises means for the purchaser to transmit over the Internet said identification information on said purchased item of merchandise to said database.

4. The system for tracking items of merchandise of claim 1 further comprising means for authenticating an item of merchandise of unknown origin having a label with identification information and a hologram by comparing said identification information on said label of said item of merchandise of unknown origin with said stored identification information in said database, said item of merchandise of unknown origin being determined as authentic when said identification information on said label of said item of merchandise of unknown origin corresponds to an entry of said stored identification information in said database.

5. The system for tracking items of merchandise of claim 1 further comprising:

said stream of commerce having a number of predetermined locations; and means for determining an exit point from said stream of commerce for an item of merchandise having a label with identification information and a hologram at a location different from said number of predetermined locations in said stream of commerce by retrieving location information from said database corresponding to said identification information on said item of merchandise at said location different from said number of predetermined, said exit point from said stream of commerce being a most recent predetermined location stored as location information in said database for said corresponding identification information of said item of merchandise.

6. The system for tracking items of merchandise of claim 1 further comprising:

said database storing destination information on each of said items of merchandise, said destination information including locations in said stream of commerce that are to receive said item of merchandise; and means for analyzing said identification information, location information and said destination information in said database to determine when a location in said stream of commerce has a low inventory of items of merchandise.

7. The system for tracking items of merchandise of claim 1 wherein said hologram on said label includes a trademark of a manufacturer of said item of merchandise.

8. A method for tracking items of merchandise through a plurality of locations in a distribution chain, said method comprising the steps of:

attaching, at an initial location in the distribution chain, a label to each item of merchandise, the label including a hologram and a machine readable code having identification information on the item of merchandise;

scanning, at the initial location, the machine readable code having identification information on the label of each item of merchandise;

recording in a database the scanned identification information on each item of merchandise at the initial location in the distribution chain;

recording for each item of merchandise in the database destination information on a location in the distribution chain to receive the item of merchandise;

scanning at a location in the distribution chain the machine readable code having identification information on the label of each item of merchandise received at the location in the distribution chain;

updating the database with the scanned identification information on each item of merchandise received at the location in the distribution chain to indicate that each item of merchandise received at the location in the distribution chain is located at the location in the distribution chain; and repeating said steps scanning at a location in the distribution chain and updating the database for each location in the distribution chain to receive an item of merchandise.

9. The method for tracking items of merchandise of claim 8 further comprising the steps of:

assembling a plurality of items of merchandise into a container, the container being configured to hold the plurality of items of merchandise;

attaching a label to said container, the container label including a machine readable code having aggregation information to identify each item of merchandise assembled into the container;

scanning the machine readable code on the container label having aggregation information on each item of merchandise assembled into the container;

recording in the database the aggregation information from the container label to identify the items of merchandise assembled into the container;

scanning at a location in the distribution chain the machine readable code having aggregation information on the container label of the container received at the location in the distribution chain;

updating the database with the scanned aggregation information on each item of merchandise in the container received at the location in the distribution chain to indicate that each item of merchandise in the container received at the location in the distribution chain is located at the location in the distribution chain; and repeating said steps scanning at a location in the distribution chain the machine readable code having aggregation information and updating the database with the scanned aggregation information for each location in the distribution chain to receive the container.

10. The method for tracking items of merchandise of claim 8 further comprising the steps of:

purchasing, by a purchaser, an item of merchandise having a label including identification information from a location in the distribution chain; and updating the database to indicate purchase of the item of merchandise having the identification information of the purchased item of merchandise.

11. The method for tracking items of merchandise of claim 10 further comprising the step of analyzing the purchase information in the database to determine the locations in the distribution chain having a low inventory of items of merchandise.

12. The method for tracking items of merchandise of claim 10 further comprising the step of authenticating the purchased item of merchandise by the purchaser.

13. The method for tracking items of merchandise of claim 12 wherein said step of authenticating further comprises the steps of:

submitting to the database the identification information for the purchased item of merchandise;

comparing the submitted identification information for the purchased item of merchandise with the recorded identification information in the database; and notifying the purchaser that the purchased item of merchandise is authentic upon the submitted identification information corresponding to recorded identification information in the database.

14. The method for tracking items of merchandise of claim 8 further comprising the step of determining an exit point from the distribution chain for an item of merchandise having a label including a hologram and identification information at a location outside of the distribution chain.

15. The method for tracking items of merchandise of claim 14 wherein said step of determining an exit point further comprises the steps of:

obtaining the identification information for the item of merchandise at a location outside of the distribution chain; and retrieving a final location entry in the database for the obtained identification information for the item of merchandise at a location outside the distribution chain.

* * * * *